Dec. 12, 1939.     W. S. WOLFRAM     2,182,999
AUTOMOBILE CLUTCH
Filed June 14, 1937     2 Sheets-Sheet 1

Inventor
William S. Wolfram
By Blackman Spencer & Flint
Attorneys

Dec. 12, 1939.     W. S. WOLFRAM     2,182,999
AUTOMOBILE CLUTCH
Filed June 14, 1937     2 Sheets-Sheet 2
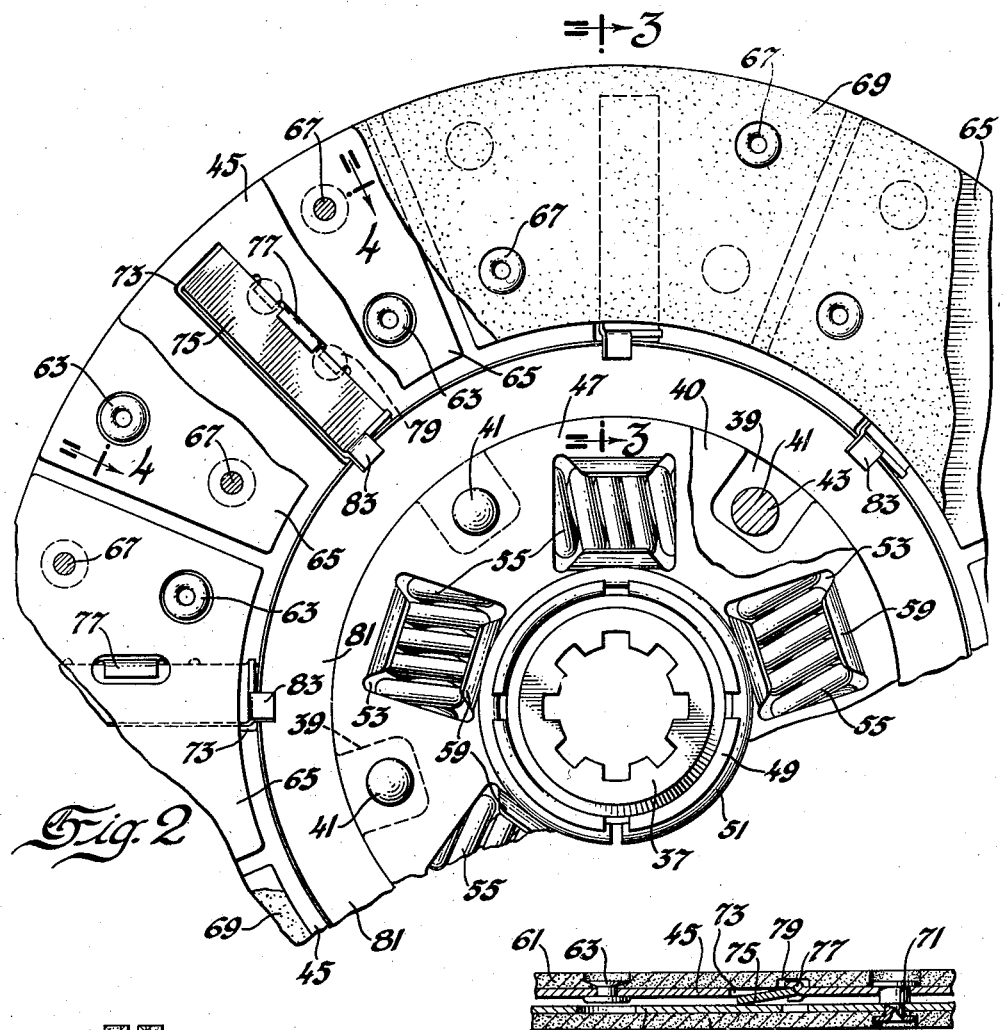
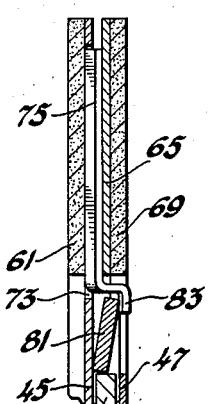
Inventor
William S. Wolfram
By Blackmore, Spencer & Flint
Attorneys Patented Dec. 12, 1939

2,182,999

UNITED STATES PATENT OFFICE 2,182,999

AUTOMOBILE CLUTCH

William S. Wolfram, Dayton, Ohio, assignor to General Motors Corporation, Detroit, Mich., a corporation of Delaware Application June 14, 1937, Serial No. 148,095

7 Claims. (Cl. 192—52)

This invention relates to friction clutches and has been designed to improve the clutch by which the engine of a motor vehicle drives the input shaft of the change speed transmission.

The main object of the invention is to improve the driven member of the conventional friction clutch.

Another object is to so arrange the parts of the driven member that gradual engagement shall take place thereby to reduce the shock of clutch engagement.

As another object of the invention uses a resilient element adapted to be compressed in the act of clutch engagement but it is so located that it is removed from the region of the friction facings and therefore is not subjected to the heat generated in the act of clutch engagement.

Other objects and advantages will be understood from the following description.

In the accompanying drawings, Figure 1 is a transverse section through the novel clutch.

Figure 2 is a view in elevation.

Figure 3 is a section on line 3—3 of Figure 2.

Figure 4 is a section on line 4—4 of Figure 2.

Figure 5 is a section like that of Figure 4 but with the parts differently positioned.

Figure 1:
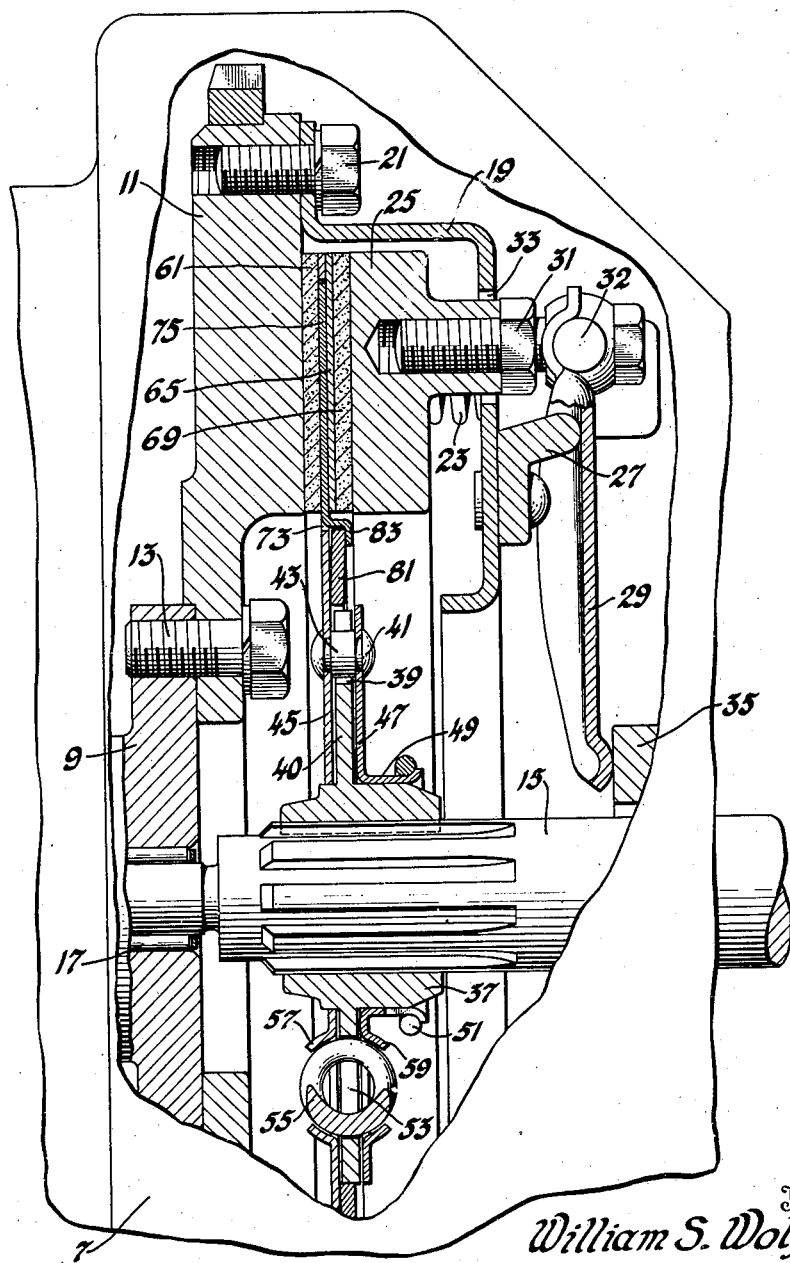

Referring to the several figures of the drawings, numeral 7 designates a more or less conventional clutch housing within which is seen the end of the crankshaft 9 and the flywheel 11 secured to the shaft by fastening means 13. At 15 is seen the transmission input shaft piloted in the end of the engine shaft by means of bearings 17. A clutch cover 19 is secured to the flywheel at 21. The cover 19 serves as an abutment for a plurality of clutch engaging springs, one of which is shown by numeral 23. These springs are operable to push a pressure plate 25 toward the flywheel and to thereby grip the driven clutch member between itself and the flywheel.

The clutch cover carries a plurality of fulcra such as 27 for pivotal engagement with fingers 29. These fingers are adapted to rotate in the act of releasing the clutch against the tension of its spring 23. The mechanism for so functioning may be seen in the drawings to include members 31 threaded into parts of the pressure plate extending through openings 33 in the cover and having heads such as 32 adapted to be engaged by the ends of the fingers 29. At 35 is a reciprocable collar adapted to be moved toward the left in Figure 1 to rotate the fingers and thereby pull the pressure plate away from the flywheel. The lever for reciprocating the collar may be conventional and is not illustrated.

The driven member of the clutch is associated with a hub 37. The hub is non-rotatably carried by the shaft 15. This hub is formed with a flange 40 preferably provided with recesses 39 through which pass rivets 41. Between the heads of the rivets and within the openings 39 each rivet has a somewhat enlarged cylindrical part 43. The driven plate 45 is rigidly secured to these rivets between one set of heads and the intermediate parts 43 as clearly shown in Figure 1. Similarly a cooperating plate 47 is secured to the rivets between the parts 43 and the other heads. The axial length of each part 43 is such as to space plates 45 and 47 slightly away from the side walls of flange 40. The dimensions of the recesses 39 and the part 43 of the rivets are such as to provide a limited relative rotary movement between the hub flange 40 and the plates 45 and 47. Plate 47 is formed with an angular axially split part 49 frictionally engaging the hub and pressed thereagainst by a resilient split ring 51.

Alternating with the recesses 39 in the hub flange 40 are openings 53. The plates 45 and 47 have openings registering with openings 53. Coil springs 55 are assembled in these registering openings. These springs may be retained in place by any convenient lip formations 57 and 59 on the plates 45 and 47. The limited relative rotary motion between the hub flange and the two plates which is made possible as explained above by the clearances within openings 39 is resiliently resisted by the springs 55, this being a known provision for cushioning the drive of such a shaft as 15. During such relative motion friction occurs between the hub and part 49, its intensity determined by pressure of ring 51.

Plate 47 terminates radially at a point slightly beyond the periphery of the hub flange 40. Driven plate 45 extends outwardly between the flywheel and the pressure plate and carries a facing 61 secured thereto by rivets 63.

A plurality of segmental plates 65 are distributed in a circular series between the plate 45 and the pressure plate. Shoulder rivets 67 extending freely through plate 45 serve to secure to the plates 65 an annular facing 69. By this construction the series of plates 65 carrying the facing 69 are guided for movement axially toward or away from plate 45, being limited in their movement of separation by the heads of rivets 71. This assembly comprising plates 65 and the facing 69 is in spaced relation from plate 45 when the clutch is released as shown in Figures 3 and 4 and in contact with plate 45 when the clutch is engaged as shown by Figure 5.

Provision is made to resiliently hold the plates apart when the clutch is released, this resilient means opposing the clutch engaging springs 23 and thus preventing the sudden gripping action which might otherwise occur. Expedients intended to perform just such a function are known in the prior art but for the most part they employ resilient means such as spring tongues or the like between the opposed facings. Such springs are therefore located where they are subjected to the heat produced by the frictional engagement of the clutch members. They are thus easily damaged.

To secure an efficient resilient means to oppose the action of the main clutch springs and also to avoid a location of such resilient means between the facings, the following expedient is herein disclosed. Holes of substantially rectangular shape designated by numeral 73 are formed in plate 45, one such hole being opposite each plate 65 and preferably midway between its ends. Within each hole is what may be called a cam plate 75. At one radial edge of the hole 73 the material of plate 45 is shaped to form a hinge as at 77 and the material of the facing 61 and plates 65 are cut away to accommodate parts of the hinge as shown at 79. This hinge allows the cam plate to swing when resiliently energized in a manner to be explained below and thereby push against plate 65 to move it away from plate 45. When the clutch is being engaged and plate 65 is being moved against plate 45 the cam plate is forced into the holes 73 as will be appreciated from a comparison of Figures 4 and 5. An annular spring 81 is normally slightly bowed or coned from a plane surface as shown by Figure 3. This plate 81 surrounds the hub flange 40 and is engaged by a lug 83 offset from an inner corner of cam plate 75 adjacent the edge opposed to the edge which is hinged to plate 45. When the clutch is in released position, the resiliency of this spring ring operating on the lug 83 tilts the cam plate 75 as shown in Figure 3 so that its unhinged edge pushes plate 65 away from plate 45. When the clutch springs are allowed to re-engage the clutch plates 65 obviously move from their spaced relation into contact with plate 45. In so moving the cam plates 75 are forced into the slots 73 and this rotation of the cam plates causes the lugs 83 to flatten the spring 81 thereby creating in the spring the potential energy available to again effect the separation when the pressure plate is moved away from the flywheel in the act of clutch release.

By the above construction it will be seen that spring 81 opposes springs 23 and insures a gradual engagement of the clutch members. Moreover the location of spring 81 radially within the clutch engaging members is such as to prevent the heat of frictional engagement being transmitted to and thereby injuring the spring 81.

I claim:

1. In a clutch, spaced driving members, a driven member therebetween, said driven member comprising a driven plate, segmental plates opposed to the driven plate, facings carried by said driven plate and said segmental plates, resilient means radially within said facing and means actuated by said resilient means and extending between said driven plate and segmental plates to space said plates apart when the clutch is relesed.

2. The invention defined by claim 1, said resilient means being a bowed spring annulus.

3. The invention defined by claim 1, said resilient means comprising an annulus of spring metal of conical form in its unstressed condition, and said means actuated thereby comprising a cam plate between each segmental plate and the driven plate, means to hinge one edge of said cam plate, said cam plate having an offset lug adjacent its opposite edge engaging said spring annulus.

4. The invention defined by claim 1, said resilient means being an annulus of spring metal of conical form in its unstressed condition and said means actuated thereby comprising a cam plate between each segmental plate and said driven plate, means to hinge one radial edge of said cam plate to said driven plate, said cam plate having an offset lug adjacent its opposite radial edge and engaging said spring annulus.

5. The invention defined by claim 1, said resilient means being an annulus of spring metal of conical form in its unstressed condition, said driven member having a plurality of apertures, said means actuated by the spring annulus comprising a plurality of cam plates each cam plate hinged at one edge to said driven member and having a lug extending radially from the opposite edge and engaged by said spring annulus whereby the spring annulus may operate through the instrumentality of said cam plates to space the segmental plates from the driven plate and whereby the cam plates may be received into said apertures of the driven plate when the clutch is engaged.

6. In a clutch, spaced driving members mounted for relative axial movement and having opposed annular parallel friction faces, a driven member having substantially parallel parts between and adapted to be engaged by said driving friction faces, said last named parts mounted to have relative axial movement, resilient means positioned as an entirety radially within said annular faces and operable to bias said parts to axially spaced relation and spring means to effect engagement of said driving and driven members.

7. In a clutch, spaced driving members mounted for relative axial movement and having opposed annular friction faces, a driven member having substantially parallel parts between and adapted to be engaged by said driving friction faces, said last named parts mounted to have relative axial movement and resilient means positioned radially within said annular faces and operable to bias said parts to axially spaced relation, a first one of said parallel parts being an unbroken ring, the other part comprising a ring formed by a plurality of segments, cam plates hinged to the first part and engaging the second parts, said cam plates having lugs engaged by said resilient means.

WILLIAM S. WOLFRAM.